United States Patent [19]

Logeman

[11] Patent Number: 5,492,360
[45] Date of Patent: Feb. 20, 1996

[54] TETHER TEAR STRAP AND TRIM PANEL HAVING SAME

[75] Inventor: Kevin Logeman, Bowmanville, Canada

[73] Assignee: Davidson Textron Inc., Dover, N.H.

[21] Appl. No.: 225,624

[22] Filed: Apr. 11, 1994

[51] Int. Cl.⁶ ................................................. B60R 21/20
[52] U.S. Cl. .......................................... 280/728.3; 411/2
[58] Field of Search ......................... 280/728 R, 728 A, 280/728 B, 732; 411/2–5, 356, 351, 513, 900, 908, 8

[56] References Cited

U.S. PATENT DOCUMENTS

| | | | |
|---|---|---|---|
| 4,327,937 | 5/1982 | Scholz et al. | 280/728 B |
| 4,602,806 | 5/1987 | Reed | 411/2 |
| 4,893,833 | 1/1990 | DiSalvo et al. | 280/732 |
| 4,925,209 | 5/1990 | Sakurai | 280/743 |
| 4,964,653 | 10/1990 | Parker | 280/732 |
| 5,066,037 | 11/1991 | Castrigno et al. | 280/732 |
| 5,161,819 | 11/1992 | Rhodes, Jr. | 280/728 |
| 5,166,079 | 11/1992 | Rhodes, Jr. | 280/732 |
| 5,199,739 | 4/1993 | Fujiwara et al. | 280/728 B |
| 5,199,834 | 4/1993 | Seidl et al. | 411/5 |
| 5,211,421 | 5/1993 | Catron | 280/728 A |
| 5,299,827 | 4/1994 | Igawa | 280/728 B |

FOREIGN PATENT DOCUMENTS 5-278551  10/1993  Japan ................................ 280/728 B

OTHER PUBLICATIONS

G.M. 10 Chevrolet "W" Instrument Panel (Overall Assembly–Lower).
G.M. 10 Chevrolet "W" Instrument Panel (Glove Box Assembly).

Primary Examiner—Karin L. Tyson
Attorney, Agent, or Firm—Reising, Ethington, Barnard & Perry

[57] ABSTRACT

An interior trim panel for a motor vehicle has an opening for deployment of an air bag and a discrete air bag door that is attached to the interior trim panel covering the opening. The door includes a relatively rigid retainer that hinges the door to the trim panel so that it opens responsive to deployment of the air bag. An unhinged end of the door is held down by two tether tear straps that break away when the air bag is deployed.

6 Claims, 2 Drawing Sheets

TETHER TEAR STRAP AND TRIM PANEL HAVING SAME

BACKGROUND OF THE INVENTION

This invention relates generally to interior trim panels for motor vehicles and more particularly to interior trim panels that have a discrete air bag door that is opened by an air bag when it is deployed into the passenger compartment.

These discrete air bag doors are commonly hinged to a retainer or other structural member of the trim panel near one end so that the door pivots open responsive to deployment of the air bag. The opposite or non-hinged end of the discrete air bag door is commonly held down for aesthetic reasons and to prevent tampering such as an accidental or intentional prying up of the unhinged end of the door. This hold down feature is particularly desirable in a top mount arrangement where a large single air bag door is mounted on the top pad of an instrument panel and hinged so that it opens into the windshield. Such an arrangement has an unhinged end near the passengers where it is easily accessed and consequently exposed to a high risk of tampering.

Various releasable hold down devices and constructions have been proposed for the unhinged end of discrete air bag doors.

One example is disclosed in U.S. Pat. No. 4,893,833 granted to Anthony J. DiSalvo and David J. Bauer Jan. 16, 1990 a closure arrangement for an air bag deployment opening in the top pad of an automotive instrument panel that includes a discrete air bag door. The door has an inner supporting layer of aluminum that has a hinging extension at one end that is bolted to a structural support plate underlying the instrument panel. The opposite end of the door is held down by a frangible tab of the door covering of foam and skin that is beneath a lip of the structural support plate of the instrument panel. In a second version, the door has an inner supporting layer of molded plastic that includes an integral hinging flange near one end that is fastened to the air bag canister. The plastic supporting layer of the door also has an integral frangible flange near the opposite end that holds the opposite or non-hinged end of the door down.

U.S. Pat. No. 4,925,209 granted to Hideyki Sakurai May 15, 1990 discloses a front mount arrangement for mounting a discrete air bag door having an aluminum insert formed integrally with the air bag door. The aluminum insert has a hinging extension at an upper end of the door that is bolted to the air bag canister. The lower end of the door is held down by bolts that extend through cut-outs in the lower end of the door covering to clamp the lower end of the door covering between a resilient member and a flange of the air bag canister.

U.S. Pat. No. 5,066,037 granted to Steven Castrigno et al Nov. 19, 1991 discloses another front mount arrangement for an air bag door having an aluminum inner member formed integrally with the air bag door. The lower end of the door is held down by an extension of the aluminum inner member that is held in a releasable latch assembly.

U.S. Pat. No. 5,096,221 granted to Richard Coombs and Scott Rafferty Mar. 17, 1992 discloses an interior trim panel for a motor vehicle having a discrete air bag door with two substrates. The second substrate is riveted to the first substrate to reinforce the door. The second substrate has extensions at each end which define a hinged connection at one end of the door and a releasable connection at the opposite end of the door which are attached to flanges of the reinforcing insert of the interior trim panel for holding the door in place until the air bag is deployed.

U.S. Pat. No. 5,116,079 granted to Richard D. Rhodes, Jr. May 26, 1992 discloses an automotive instrument panel having an integrated air bag door. The lower end of the door skin carries a depending flap that is sewn to an inwardly extending flap of the instrument panel skin to hold the lower end of the door down. The line of stitching forms a frangible tear seam line.

U.S. Pat. No. 5,161,819 granted to Richard D. Rhodes Nov. 10, 1992 discloses a tamper proof air bag door in a top mount arrangement. The unhinged end of the door is held down by hook and loop fastener strips.

U.S. patent application Ser. No. 08/037,337 filed by Mark Guitarini Jun. 7, 1993 discloses top mount arrangements in which the unhinged ends of the air bag doors are held down by cable release mechanisms.

While each of the above air bag door arrangements may be useful for their intended purposes, there is still a need for a simple and efficient device for holding down the unhinged end of an air bag door and releasing it responsive to deployment of the air bag.

SUMMARY OF THE INVENTION

The object of this invention is to provide a simple and efficient device in the form of a tether tear strap for holding down an end of an air bag door and releasing it responsive to deployment of the air bag.

Another object of this invention is to provide an automotive interior trim panel having an air bag door that is held down at an end by at least one such tether tear strap.

A feature of the invention is that the tether tear strap provides a simple and efficient frangible attachment for releasably holding a non-hinged end of an air bag door down.

Another feature of the invention is that the tether tear strap is of one piece construction and consequently economical to manufacture.

Another feature of the invention is that the tether tear strap is easy to install.

Still another feature of the invention is that the tether tear strap is attached to a structural member of the air bag door without any need for bolts, screws or other fasteners.

Still another feature of the invention is that the tether tear strap is attached to a structural member of the trim panel by a single fastener facilitating economical installation.

Still another feature of the invention is that the tether tear strap has a notched shank that fractures to release the air bag door responsive to air bag deployment and that is easily adjusted to provide a desired force level response.

Still yet another feature of the invention is that the parts of the fractured tether tear strap are securely retained by the trim panel and the air bag door after air bag deployment.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
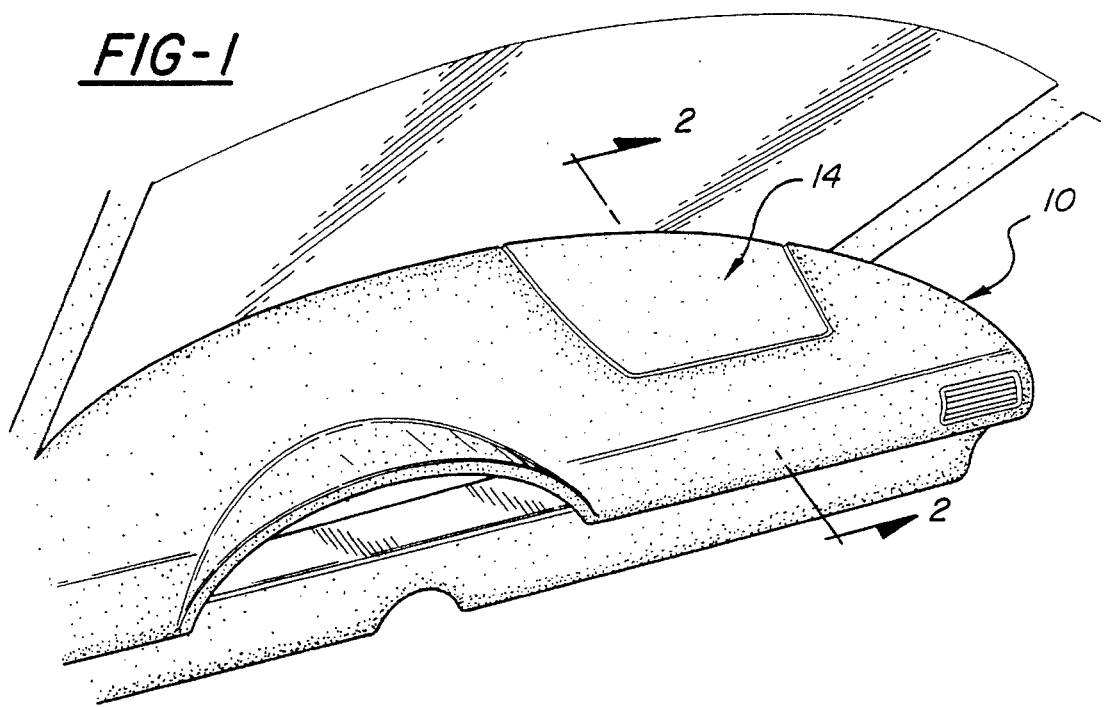
FIG. 1 is a perspective view of an automotive trim panel having an air bag opening that is closed by an air bag door that is held down by a tether tear strap in accordance with the invention.

Referring now to the drawing, FIG. 1 shows an automotive interior trim panel 10 that is a top pad of an instrument panel and that includes an air bag opening 12 for deployment of an air bag 13 into the passenger compartment. The panel 10 further includes a discrete air bag door 14 so that it closes the air bag opening 12 in a top mount arrangement. The door 14 is thrust open by the air bag 13 which is stored in a canister 15 beneath the door 14 when the air bag is inflated and deployed responsive to a predetermined vehicle deceleration in a well known manner.

The interior trim panel 10 comprises a retainer 16 of relatively rigid plastic material such as polycarbonate, polypropylene or any injection moldable structural plastic and such material may be filled with glass fibers or the like. The retainer 16 may also be a metal casting or stamping that is molded to the final shape needed for functional and pleasing shape of the finished trim panel 10. The retainer 16 can also be made of a porous fiber board like material and other moldable compositions that meet the specifications for a structural retainer.

The interior trim panel 10 further comprises a cover 18 of relatively soft and flexible decorative material such as expandable foam backed vinyl. Other examples of a suitable stock for cover 18 including laminations, organic or synthetic cloth or cloth combinations, foam, plastic and other materials generally used in automotive trim panels.

Figure 2:
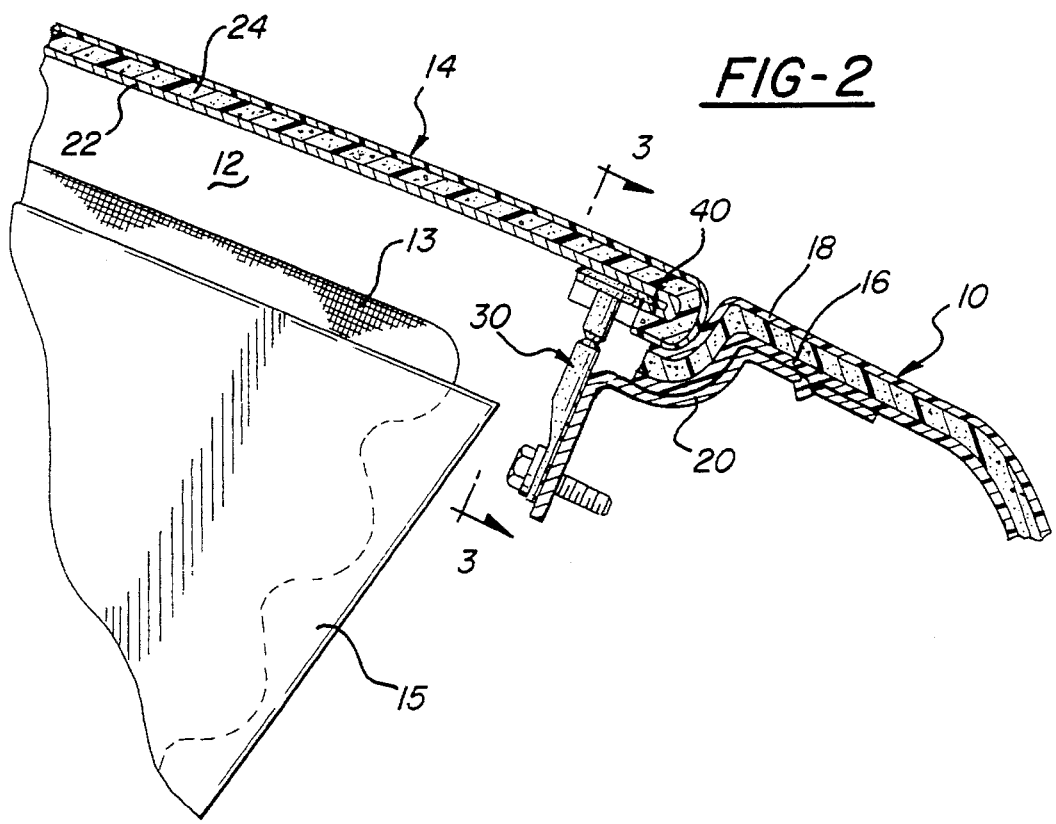
FIG. 2 is a cross section of the trim panel taken substantially along the line 2—2 of FIG. 1 looking in the direction of the arrows.

The air bag opening 12 is defined by the retainer 16 as best shown in FIG. 2 and the air bag door 14 is mounted on the retainer 16 by means of an annular metal bracket 20 that is aligned with the air bag opening 12 and fastened to the underside of the retainer 16.

The air bag door 14 is a composite structure like the trim panel 10 comprising a retainer 22 of relatively rigid material, such as steel sheet metal, and a cover 14 of relatively soft and flexible material, such as expanded vinyl. The retainer 22 is formed integrally with the air bag door 14 for defining the shape of the air bag door 14 and the cover 24 matches the cover 18 of the interior trim panel 10. In this particular instance the covers 18 and 24 are both made of an expanded vinyl which comprises a skin or outer layer for a smooth feel and an integral resilient foam backing layer for a soft touch.

The air bag retainer 22 is attached to the trim panel 10 near the forward or windshield end so that the air bag door 14 covers the air bag opening 12 and pivots upwardly toward the windshield to an open position in response to air bag deployment. The air bag retainer 22 is attached by any suitable hinge arrangement, such as those disclosed in U.S. Pat. Nos. 4,893,833, 4,925,209 and 5,116,079 discussed above.

The opposite unhinged end of the retainer 22 which is closest to the passengers is held down by a tether tear strap 30 to improve the aesthetic and tamper proof qualities of the air bag door 14. The tether tear strap 30 fractures and gives way when the air bag door 14 is thrust open in response to air bag deployment.

The tether tear strap 30 comprises a frangible shank 32 that has a flat frustoconical head 34 overlying an enlarged disc like neck 36 at one end for attaching the tether tear strap 30 to the door retainer 22. The opposite end of tether tear strap 30 has a flat axial tail disk 38 that has a bolt hole 39 for attaching the tether tear strap 30 to the annular bracket 20 of the trim panel 10.

The air bag door retainer 22 has a reverse lip 40 at the passenger or rearward end that preferably extends for the entire width of the door 14. The reverse lip 40 has a slot 42 for each tether tear strap 30 that extends transversely of the rearward edge of the door retainer.

For installation, the head 34 of the tether tear strap 30 is forced into the space between the reverse lip 40 and the adjacent margin of the door retainer 22 and held in place by a clamping action of the reverse lip 40. The tapered circumference of the head 34 is advantageously used to initiate insertion and spread the reverse lip 40 and the retainer margin apart. When the head 34 is installed, the enlarged neck 36 underlying the head 34 fits into the slot 42. The width of the slot 42 is substantially equal to the diameter of the enlarged neck 36 of the tether tear strap 30 so that the slot 42 locates the tether tear strap 30 in the lateral direction.

Figure 3:
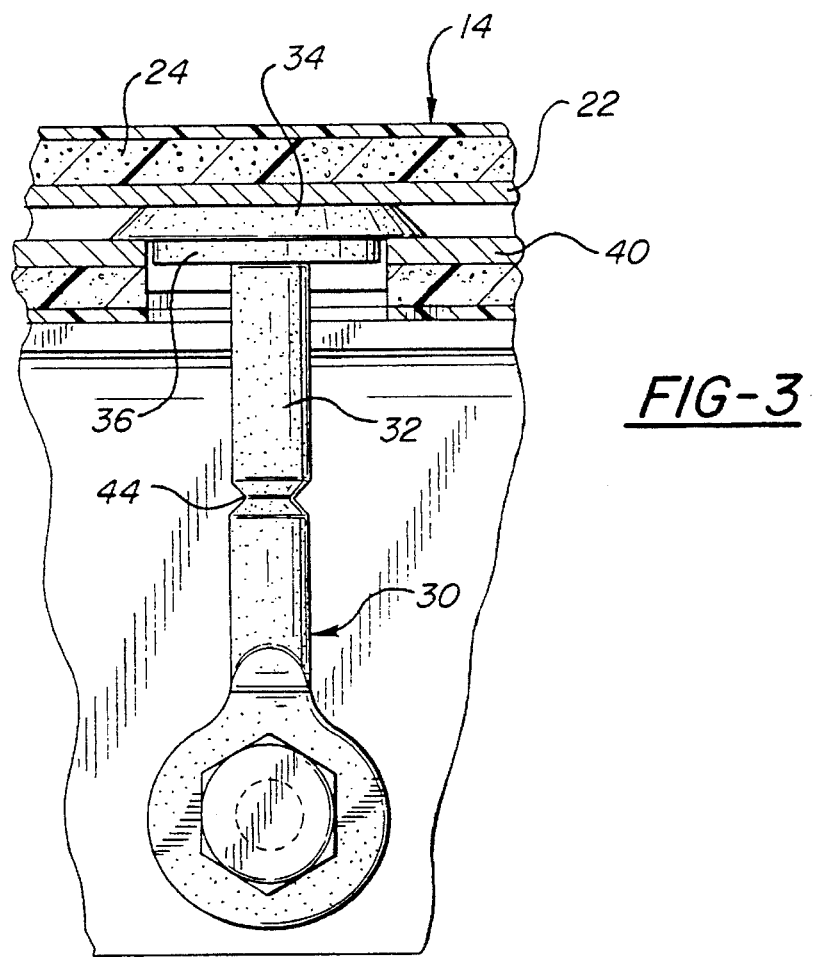
FIG. 3 is a section of the trim panel taken substantially along the line 3—3 of FIG. 2 looking in the direction of the arrows.
Figure 4:
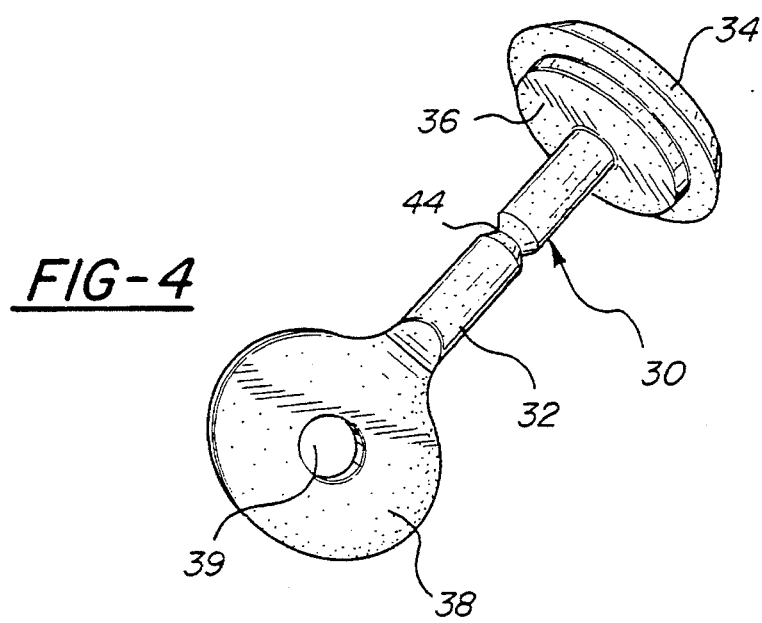
FIG. 4 is a perspective view of the tether tear strap shown in FIGS. 2 and 3.

The tether tear strap 30 is then bolted to the bracket 20 to complete installation as shown in FIGS. 2 and 3. A tether tear strap 30 is preferably installed at each rearward corner of the air bag door 14. However any number of tether tear straps may be used depending on the break-away and tamper proof characteristics desired. When the tether tear strap or straps are installed, the rearward or passenger end of the door 14 is clamped against a ledge of the trim panel 10 in the closed position as best shown in FIG. 2. This clamping arrangement enhances the tamper proof qualities and the aesthetic appearance by matching the outer surface of the door 14 with the contour of the trim panel 10 with greater ease and precision.

The shank 32 has a circumferential notch at 40 so that the shank 32 fractures at the notch in response to force of the inflating air bag acting on the air bag door 14. The size, shape and location of the notch 44 are easily altered so that the shank 32 breaks into the desired size remnants at a precise predetermined application of force.

The tether tear strap 30 is of one piece construction for economical manufacture. It may be formed from metal or molded of a plastic material. The tether tear strap 30 is easily installed on the door retainer 22 without need of any fasteners. The installation is then completed with just one fastener connecting the tether tear strap 30 to the trim panel bracket 20. The fracture location and force are easily adjusted by changing the size, shape and location of the notch 44 in the shank 32. Furthermore the remnants are firmly retained by the door retainer 22 and the trim panel bracket 20 after air bag deployment.

The invention has been described in an illustrative manner, and it is to be understood that the terminology which has been used is intended to be in the nature of words of description rather than of limitation.

Obviously, many modifications and variations in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. An interior trim panel for a motor vehicle having an opening for deployment of an air bag and an air bag door that is attached to the interior trim panel for closing the opening and for being thrust opened by an air bag when it is deployed comprising;

a retainer forming part of and defining an initial shape of the air bag door, the retainer having an inner portion and an outer portion, a metal or molded plastic tether tear strap attached to the retainer and to the trim panel for holding the air bag door in a closed position, the tether strap having a shank and a head that is substantially wider than the shank, the tether strap being attached to the retainer by the head disposed between the inner and the outer portion of the retainer, and the tether tear strap having a fracturable portion that is fractured to release the door responsive to deployment of the air bag.

2. An interior trim panel for a motor vehicle having an opening for deployment of an air bag and an air bag door that is attached to the interior trim panel for closing the opening and for being thrust open by an air bag when it is deployed comprising;

a retainer forming part of and defining an initial shape of the air bag door, the retainer having a end that has a reverse lip, a tether tear strap that has a head that is clamped to the retainer by the reverse lip and a tail that is attached to the trim panel for holding the air bag door in a closed position, and the tether tear strap having a shank that is fractured across the shank to release the door responsive to deployment of an air bag.

3. An interior trim panel for a motor vehicle having an opening for deployment of an air bag and an air bag door that is attached to the interior trim panel for closing the opening and for being thrust open by an air bag when it is deployed comprising;

a retainer forming part of and defining an initial shape of the air bag door, the retainer having an unhinged end that has a reverse lip, the reverse lip having a slot, a tether tear strap that has a flat frustoconical head that is clamped to the retainer by the reverse lip and an enlarged neck underlying the head that is disposed in the slot, for lateral location, the tether tear strap having an axial tail disk that is attached to the trim panel by a single fastener for holding the air bag door in a closed position, and the tether tear strap having a shank that is notched so as to fracture and release the door responsive to deployment of the air bag.

4. A tether tear strap for releasably attaching an air bag door to an interior trim panel for a motor vehicle that has an opening for deployment of an air bag, the air bag door being attached to the interior trim panel for closing the opening and for being thrust open by an air bag when it is deployed, the tether tear strap comprising;

a fracturable shank having an enlarged neck in comparison to the shank, at one end for locating the tether strap in a slot laterally and a flat head overlying the neck for attaching the tether tear strap to a retainer of the air bag door, an axial tail at the opposite end for attaching the tether tear strap to the trim panel, and the fracturable shank having a fracturable portion between the one end and the opposite end.

5. A non-elastomeric tether tear strap of one-piece construction for releasably attaching an air bag door to an interior trim panel for a motor vehicle that has an opening for deployment of an air bag, the air bag door being attached to the interior trim panel for closing the opening and for being thrust open by an air bag when it is deployed, the tether tear strap comprising;

a shank having a notch so that the shank fractures at the notch responsive to the air bag door being thrust open by the deploying air bag, a flat frustoconical head at one end of the shank for clamping attachment of the tether tear strap to a retainer of the air bag door, an enlarged neck in comparison to the shank underlying the frustoconical head for locating the tether tear strap laterally in a slot, and an axial tail disk at the opposite end of the shank, the axial tail disk having a hole for attaching the tether tear strap to a trim panel.

6. The tether tear strap as defined in claim 4 wherein the head has a tapered circumference.

* * * * *